(12) United States Patent
Chuang et al.

(10) Patent No.: US 9,400,671 B2
(45) Date of Patent: Jul. 26, 2016

(54) COMPUTER HOST WITH A BASEBOARD MANAGEMENT CONTROLLER TO MANAGE VIRTUAL MACHINES

(71) Applicant: LENOVO ENTERPRISE SOLUTIONS (SINGAPORE) PTE. LTD., Singapore (SG)

(72) Inventors: Hank C H Chuang, Taipei (TW); Ming-Ho Hu, Taipei (TW); Ku Chang Kuo, Taipei (TW); ChungWen Ma, Taipei (TW)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 132 days.

(21) Appl. No.: 14/277,199

(22) Filed: May 14, 2014

(65) Prior Publication Data

US 2014/0359615 A1 Dec. 4, 2014

(30) Foreign Application Priority Data

May 31, 2013 (TW) .............................. 102119507 A

(51) Int. Cl.
*G06F 9/455* (2006.01)
(52) U.S. Cl.
CPC .. *G06F 9/45558* (2013.01); *G06F 2009/45579* (2013.01)
(58) Field of Classification Search
None
See application file for complete search history.

(56) References Cited

U.S. PATENT DOCUMENTS

| | | | |
|---|---|---|---|
| 7,392,172 B2 | 6/2008 | Rostampour | |
| 7,853,958 B2 * | 12/2010 | Mathew | G06F 11/0712 718/1 |
| 7,926,054 B2 * | 4/2011 | Sonderegger | G06F 9/45558 718/1 |
| 8,028,155 B1 | 9/2011 | Righi et al. | |
| 8,032,741 B2 * | 10/2011 | Smith | G06F 21/57 713/100 |
| 8,127,292 B1 | 2/2012 | Dobrovolskiy et al. | |
| 8,327,169 B2 | 12/2012 | Bozek et al. | |
| 8,438,216 B2 | 5/2013 | Runcie et al. | |
| 2009/0125901 A1 | 5/2009 | Swanson | |
| 2011/0153798 A1 | 6/2011 | Groenendaal et al. | |
| 2011/0161482 A1 | 6/2011 | Bonola et al. | |
| 2012/0023031 A1 | 1/2012 | Galya | |
| 2012/0233608 A1 | 9/2012 | Toeroe | |

FOREIGN PATENT DOCUMENTS

WO    2010008707 A1    1/2010

OTHER PUBLICATIONS

Gao, Yuan et al. "Building a virtual machine-based network storage system for transparent computing", 2012 International Conference on Computer Science and Service System, IEEE, pp. 2341-2344.

* cited by examiner

*Primary Examiner* — Gregory A Kessler
(74) *Attorney, Agent, or Firm* — Patterson + Sheridan LLP

(57) ABSTRACT

Disclosed is a computer host, including a visualization platform and a baseboard management controller (BMC). The visualization platform allows a plurality of virtual machines to operate simultaneously on the computer host, and the visualization platform has a daemon for receiving a management command from outside the visualization platform. The BMC executes a management application to generate and send the management command to the daemon.

12 Claims, 4 Drawing Sheets

COMPUTER HOST WITH A BASEBOARD MANAGEMENT CONTROLLER TO MANAGE VIRTUAL MACHINES

This application is based on and claims the benefit of priority from Taiwan Patent Application 102119507, filed on May 31, 2013.

BACKGROUND OF THE INVENTION

1. Field of the Invention

The present invention relates generally to a computer host with a plurality of virtual machines operating thereon simultaneously.

2. Description of the Prior Art

In 1999, VMware launched a technology known as "VMware Workstation Virtualization" which not only enables a workstation, a server, and multiple services to operate simultaneously on the same physical computer host by the virtualization of VMware to thereby simplify system management and reduce hardware requirements. Common conventional virtualization solutions include KVM (kernel virtual machine), VMWare ESXi, Microsoft Hyper-V, Citrix Xen Server, and QEMU.

To manage virtual machines operating on a visualization platform, a user uses a local or remote visualization platform (for example, hypervisor, also known as virtual machine monitor (VMM)) to generate and send a management command (in XML format, for example). For more information, read Chapters 15-17 of the Virtualization Guide (http://www.centos.org/docs/5/html/Virtualization-en-US/index.html) published by Red Hat, Inc.

For more information pertaining to virtual machine management, refer to U.S. Pat. No. 8,438,216, US 2012/0023031, US 2011/0161482, and US 2012/0233608.

SUMMARY OF THE INVENTION

In one aspect of the present invention, a computer host is equipped with a baseboard management controller for managing virtual machines and, in particular, uses an application operating on the baseboard management controller to generate and send a management command, without taking up the computation resources and communication resources assignable by the computer host to the virtual machines.

By contrast, virtual machine management conventionally requires the inherent computation resources and communication resources of the computer host. Also, a visualization platform (for example, hypervisor or virtual machine monitor (VMM)) of a computer host conventionally generates and sends a management command; however, doing so entails taking up the inherent hardware resources of the computer host and thus reducing the physical resources allocated to the virtual machines. If a system administrator enters into, or specifies for, the visualization platform an intended management command by a remote console, the flow of the input/output (I/O) of a physical network interface card (NIC) or even other related transmission resources of the computer host will be taken up to the detriment of the connection resources available to the virtual machines in operation.

Furthermore, according to the prior art, to generate and send a management command based on an input or operation of the system administrator, it is necessary that additional specific software or hardware support is available to the visualization platform. As a result, the prior art not only adds to the difficulty in implementation but also reduces the physical resources allocated to the virtual machines.

In another aspect of the present invention, the baseboard management controller on the computer host provides Internet Protocol-based (IP-based) network connection to clients. The clients get connected to the baseboard management controller and then logs in to an intended virtual machine on the computer host though the baseboard management controller to start operating. In particular, the baseboard management controller identifies and forwards the communication to the intended virtual machine in accordance with a communication port specified by the clients, and the technique is known as "port forwarding."

Moreover, according to the prior art, to enable a remote client to get connected to a virtual machine by Internet Protocol-based (IP-based) network connection, it is necessary that the communication takes place via a physical network interface card (NIC) on the computer host. By contrast, according to the present invention, Internet Protocol-based (IP-based) network connection between the virtual machine and the remote client is created by means of the baseboard management controller, without taking up the inherent network transmission resources of the computer host.

According to an embodiment of the present invention, a computer host comprises a visualization platform and a baseboard management controller. The visualization platform enables a plurality of virtual machines to operate simultaneously on the computer host. The visualization platform has a daemon for receiving a management command from outside the visualization platform. The baseboard management controller executes a management application to generate and send the management command to the daemon.

According to another embodiment of the present invention, a computer-implemented method applied to the computer host above comprises the steps of:

(a) communicating with the baseboard management controller by a client; and (b) generating and sending the management command to the daemon by the management application in response to an operation initiated by the client.

According to yet another embodiment of the present invention, a computer-implemented method applied to the computer host above comprises the steps of:

(a) communicating with a virtual machine by a client through the baseboard management controller; and (b) logging in to the virtual machine by the client through the baseboard management controller to initiate an operation.

According to a further embodiment of the present invention, a computer program product stored in a computer-available medium and comprising a computer-readable program executable on a computer system to implement the aforesaid method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
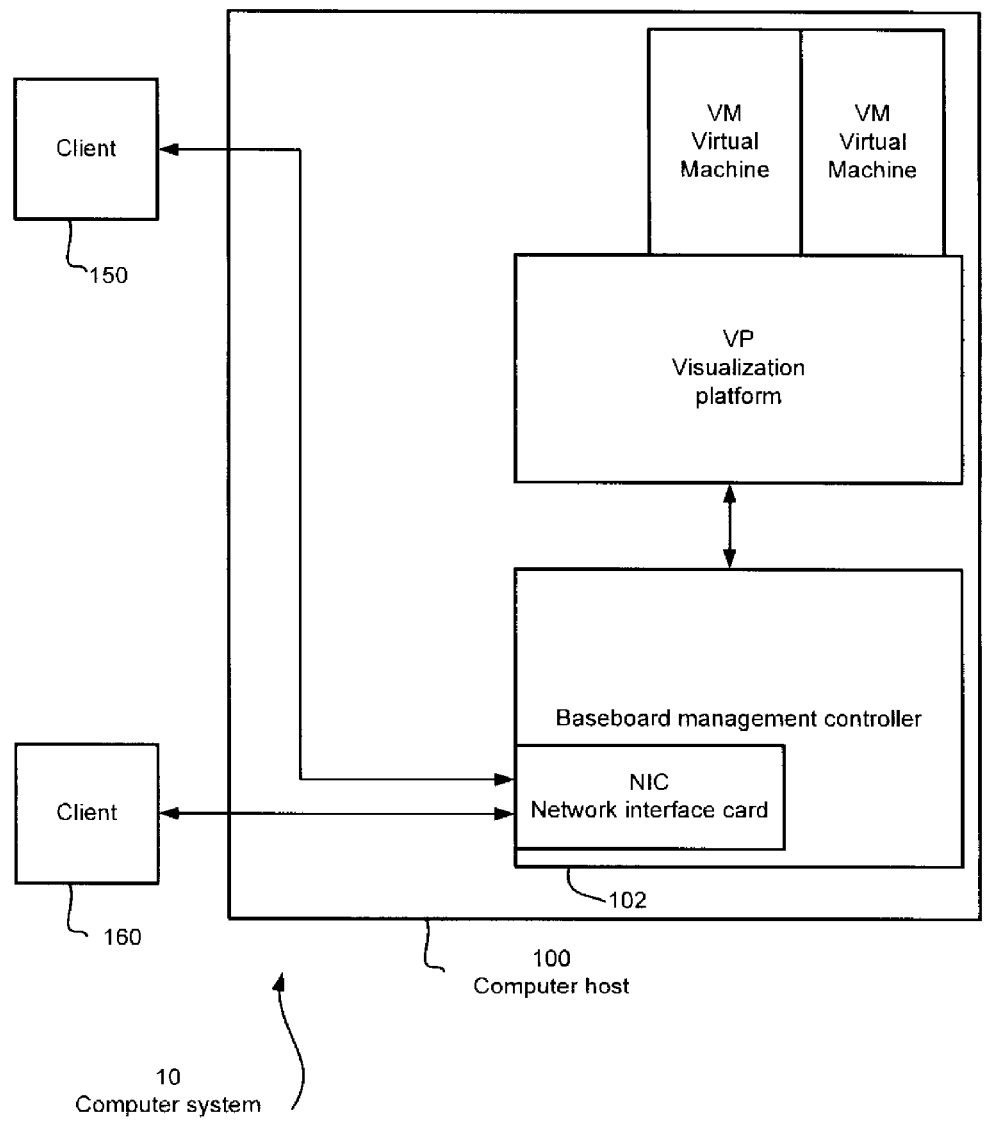
FIG. 1 is a block diagram of a computer system according to an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the users computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 4, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Framework>

Referring to FIG. 1, there is shown a block diagram of a hardware framework of a computer system 10 according to an embodiment of the present invention. The computer system 10 comprises a computer host 100 and clients 150, 160. The clients 150, 160 come in the form of local clients of the computer host 100. Alternatively, remote clients of the computer host 100 communicate with the computer host 100 via a network (such as the Internet or an intranet (not shown)) or by direct connection.

For details of the basic hardware framework of the computer host 100, refer to IBM's System X, Blade Center, and eServer. The computer host 100 has a visualization platform (VP), such as hypervisor or virtual machine monitor (VMM). A plurality of virtual machines VM operates simultaneously on the visualization platform VP. The virtual machines VM use different guest operating systems (Guest OS), respectively, and are accessible to different users (for example, via the clients 150, 160).

The visualization platform VP is implemented by means of software, such as Microsoft Virtual Server, VMWare Server, VMWare ESX Server, or Linux Virtual Server. Alternatively, the visualization platform VP is implemented by means of hardware or firmware. The above-mentioned is not restrictive of the present invention.

Figure 2:
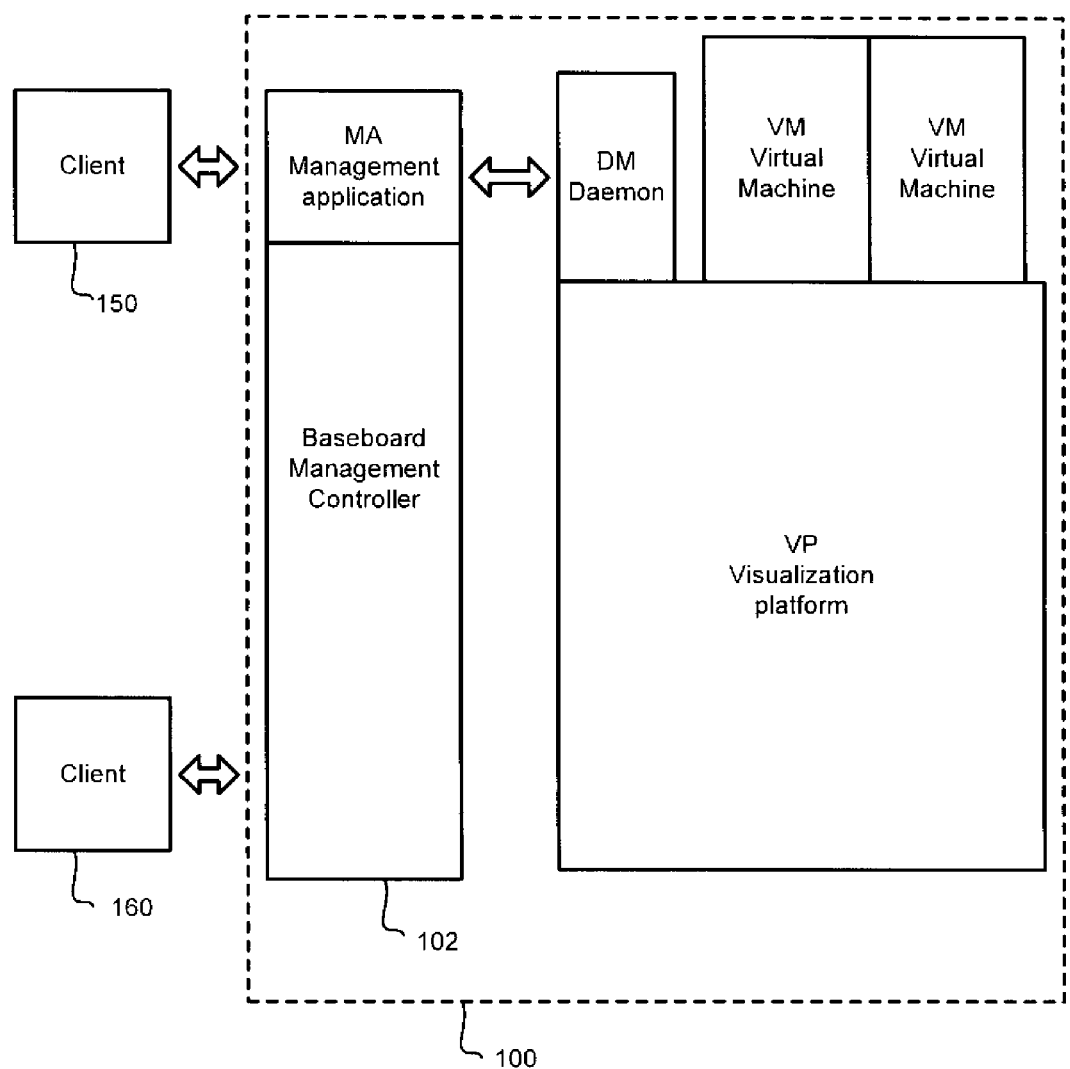
FIG. 2 is a block diagram of a computer host according to an embodiment of the present invention.

Referring to FIG. 2, for the purpose of managing virtual machines VM, the visualization platform VP has a daemon DM for receiving a management command from outside the visualization platform VP and forwarding the received management command to the virtual machines VM. Alternatively, the visualization platform VP operates in accordance with the management command received by the daemon DM. In an embodiment, the daemon DM is implemented by making reference to libvirtd libvirt daemon).

In this regard, libvirt is an open-source application interface (API), supports various visualization platforms of different specifications, and transmits data by eXtensible Markup Language (XML), so as to provide surveillance and management interfaces for use with virtual machines. For more information, visit the libvirt Website http://libvirt.org/ and the IBM developerWorks Website http://www.ibm.com/developerworks/linux/library/l-libvirt/

Persons skilled in the art understand that the computer host 100 has a power supply (not shown), a main memory module (not shown), an auxiliary memory module (such as hard disk drive, compact disk, or solid-state drive (SSD)) (not shown), any mass storage device (not shown), and a fan (not shown). In this regard, details not related to the present invention are not described hereunder for the sake of brevity.

Particularly, the computer host 100 has a baseboard management controller (BMC) 102; for details of the basic framework of the baseboard management controller (BMC) 102, refer to the Integrated Management Module (IMM) and the Integrated Management Module II (IMM2) service processor produced by IBM. For more information about the basic functions manifested by the baseboard management controller 102 but not directly related to the present invention, refer to U.S. Pat. No. 8,327,169, US 2012/0023031, and US 2011/0161482.

In this embodiment, the baseboard management controller 102 communicates with the visualization platform VP by means of LAN-Over-USB, for example, and supports in-band/out-of-band channel communication. Referring to FIG. 2, the baseboard management controller 102 executes a management application MA for generating and sending a management command (in XML format, for example) to the aboved daemon DM.

The management command sent from the management application MA to the daemon DM not only includes the management command provided to the visualization platform VP, for example, to request the visualization platform VP to create the virtual machines VM, but also includes the management command provided to the specific virtual machines VM, for example, to request the virtual machines VM to perform a system management operation (for example, configuring the memory and hard disk allocation in the virtual machines VM.) After creating each said virtual machine VM, the visualization platform VP assigns an identifier to each said virtual machine VM, such that the daemon DM issues the management command to the intended virtual machine VM according to the identifier.

Referring to FIG. 1, the baseboard management controller 102 has a dedicated network interface card NIC. For more information about a dedicated network interface card NIC of a baseboard management controller 102, refer to US 2011/0161482. It should be noted that the network interface card NIC is different from an inherent network interface card (not shown) of the computer host 100 in that, for example, not only do they have different MAC addresses, but they are also allocated different IP Addresses. In this embodiment, as shown in FIG. 1, the clients 150, 160 are connected to the baseboard management controller 102 via the network interface card NIC instead of the inherent network interface card of the computer host 100, and such a technical feature, however, is not restrictive of the present invention; hence, in another embodiment, the baseboard management controller 102 does not have any dedicated network interface card but communicates with the clients 150, 160 via the inherent network interface card of the computer host 100.

The operation performed by the clients 150, 160 through the baseboard management controller 102 is described below.

<First Method Process Flow>

Figure 3:
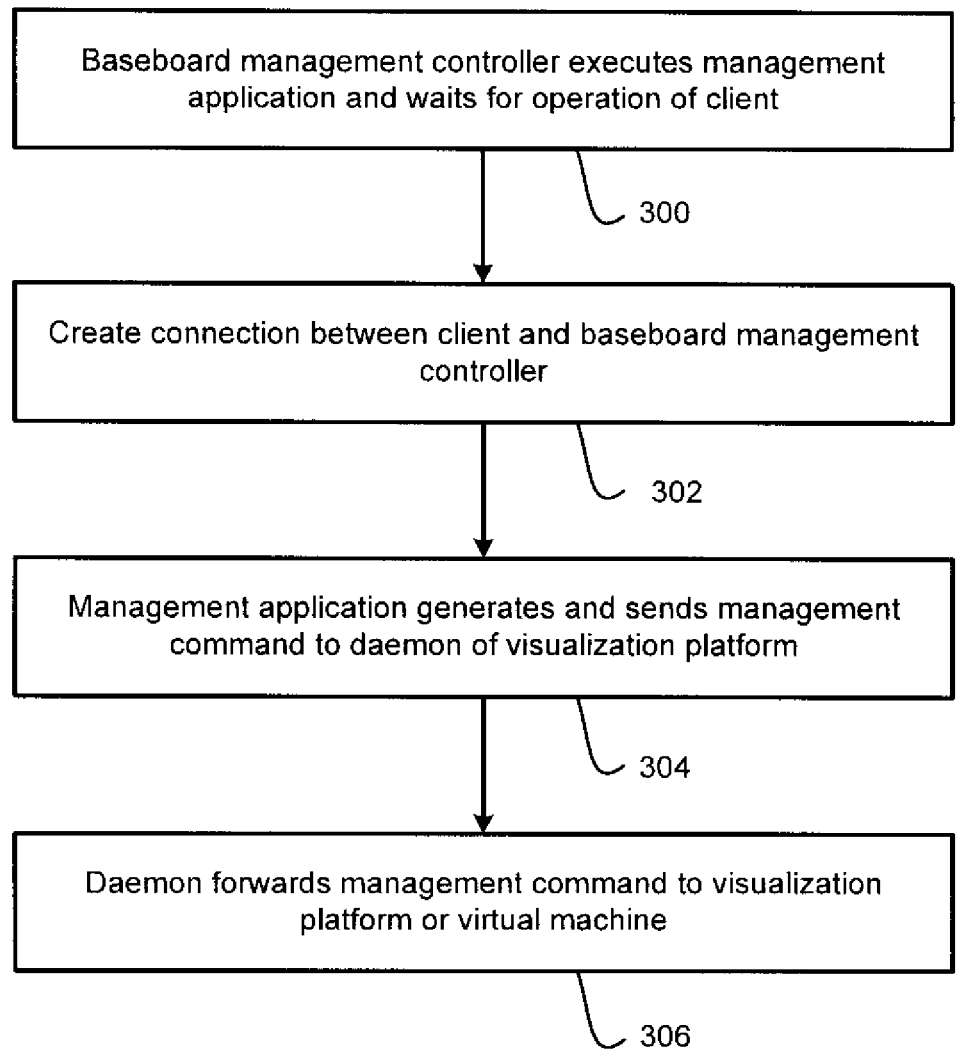
FIG. 3 and FIG. 4 are flow charts of a method according to an embodiment of the present invention.

The process flow of a method according to an embodiment of the present invention is illustrated with a flow chart shown in FIG. 3 and described as follows:

Step 300: the baseboard management controller 102 executes the management application MA and waits for an input command or an operation of the client 150. In an embodiment, IBM System Director Server program is installed on the client 150, whereas the management application MA is provided in the form of IBM System Director Agent program, such that the client 150 can operate the baseboard management controller 102 or enter a command into the baseboard management controller 102, wherein the computer host 100, the visualization platform VP, or the virtual machine VM can be monitored by the baseboard management controller 102. In another embodiment, the baseboard management controller 102 supports a Web interface for the client 150 to operate or enter a command, wherein the client 150 needs only an ordinary Web browser.

Step 302: create a connection between the client 150 and the baseboard management controller 102. Preferably, the baseboard management controller 102 has a dedicated network interface card NIC (shown in FIG. 1). The connection between the client 150 and the baseboard management controller 102 is based on Internet Protocol (IP). Hence, the client 150 and the baseboard management controller 102 are each assigned an IP Address in advance. The client 150 communicates with the baseboard management controller 102 according to the IP Address of the baseboard management controller 102. It is also practicable that there are any other communication protocols or communication means between the client 150 and the baseboard management controller 102.

Step 304: the management application MA generates a management command wanted by a user and sends the management command to a daemon DM of the visualization platform VP in response to an input command or an operation of the client 150.

Step 306: the daemon DM provides the received management command to the visualization platform VP for use or forwards the received management command to the specific virtual machine VM. For more information, refer to the aforesaid libvirtd (i.e., libvirt daemon).

<Second Method Process Flow>

Figure 4:
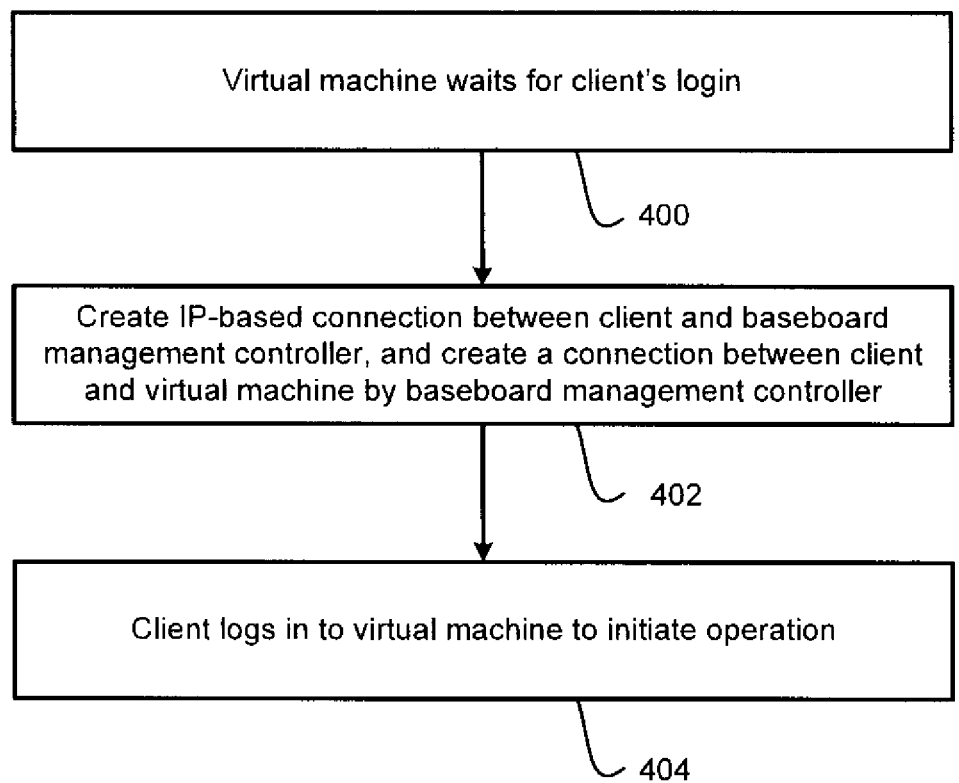

The process flow of a method according to an embodiment of the present invention is illustrated with a flow chart shown in FIG. 4 and described as follows:

Step 400: a virtual machine VM installs and executes remote control server software, such as VNC Server, and waits for the login of the client 160, whereas the client 160 correspondingly installs and executes remote control client software, such as VNC Viewer.

Step 402: create a connection between the client 160 and the baseboard management controller 102. Preferably, the baseboard management controller 102 has a dedicated network interface card NIC (shown in FIG. 1), wherein the connection between the client 160 and the baseboard management controller 102 is based on Internet Protocol (IP), such that the client 160 creates a connection to the baseboard management controller 102 in accordance with the IP address of the baseboard management controller 102 (for example, by entering into remote control client software the IP address of the baseboard management controller 102), and the baseboard management controller 102 automatically creates a connection to the virtual machine VM via its communication channel (for example, LAN-Over-USB) with the visualization platform VP, thereby creating a connection between the client 160 and the virtual machine VM.

In particular, a specific communication port is included in the connection between the client 160 and the baseboard management controller 102, such that the baseboard management controller 102 identifies the virtual machine VM wanted by the client 160 according to the communication port and thus gets connected to it. Hence, the baseboard management controller 102 enables "port forwarding" between the client 160 and the virtual machine VM which the client 160 wants to get connected to.

Step 404: after the baseboard management controller 102 has created the connection between the client 160 and the virtual machine VM, the client 160 enters a password with remote control client software to log in to the virtual machine VM and initiate an operation, for example, browsing a file in the virtual machine VM. Remote control in general is performed in step 404 and thus is not described herein for the sake of brevity.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. A computer host, comprising:
   a computer processor;
   a memory storing instructions, which when executed by the processor, provides:
   a virtualization platform allowing at least a first virtual machine and a second virtual machine to operate simultaneously on the computer host, wherein the virtualization platform has a daemon for receiving a management command from outside the virtualization platform; and
   a baseboard management controller (BMC) executing a management application configured to:
   generate the management command; and
   send the management command to the daemon, wherein the daemon is configured to forward the command to at least one of the first and second virtual machines, wherein the command modifies at least one of the first and second virtual machines.

2. The computer host of claim 1, wherein the virtualization platform creates one of the first virtual machine and/or the second virtual machine according to the management command received by the daemon.

3. The computer host of claim 1, wherein wherein the command modifies the first virtual machine, wherein the modification comprises a first system management operation performed in the first virtual machine.

4. The computer host of claim 3, wherein command further modifies the second virtual machine, wherein modifying the second virtual machine comprises performing second system management operation in the second virtual machine.

5. The computer host of claim 1, wherein the baseboard management controller communicates with a first client, and the management application generates the management command in response to an operation of the first client.

6. The computer host of claim 5, wherein the baseboard management controller comprises a network interface card whereby the baseboard management controller communicates with the first client.

7. The computer host of claim 6, wherein a communication based on Internet Protocol (IP) takes place between the baseboard management controller and a second client via the network interface card, and the baseboard management controller forwards the communication to the first virtual machine to allow the second client to log in to the first virtual machine through the baseboard management controller and thus start operating.

8. The computer host of claim 7, wherein the baseboard management controller forwards a communication of the second client to the first virtual machine according to a communication port specified in the communication of the second client.

9. A method, comprising:
receiving, by a baseboard management controller (BMC), a request to perform a management operation to at least one of a first virtual machine and a second virtual machine executing on a virtualization platform;
generating, by the BMC, a command corresponding to the management operation;
sending, by the BMC, the command to a daemon executing on the virtualization platform; and
forwarding, by the daemon, the command to the at least one of the first and second virtual machines.

10. The method of claim 9, wherein the command comprises creating one of the first virtual machine and the second virtual machine by the virtualization platform.

11. The method of claim 9, wherein the request is received from a client, wherein the BMC is configured to allow the client to log in to the first virtual machine to initiate the management operation.

12. The method of claim 9, wherein the request specifies a communication port, wherein the BMC sends the command via the specified communication port.

* * * * *